July 6, 1926.
J. F. HENNESSY
ABRADING MACHINE
Filed March 8, 1922
1,591,624
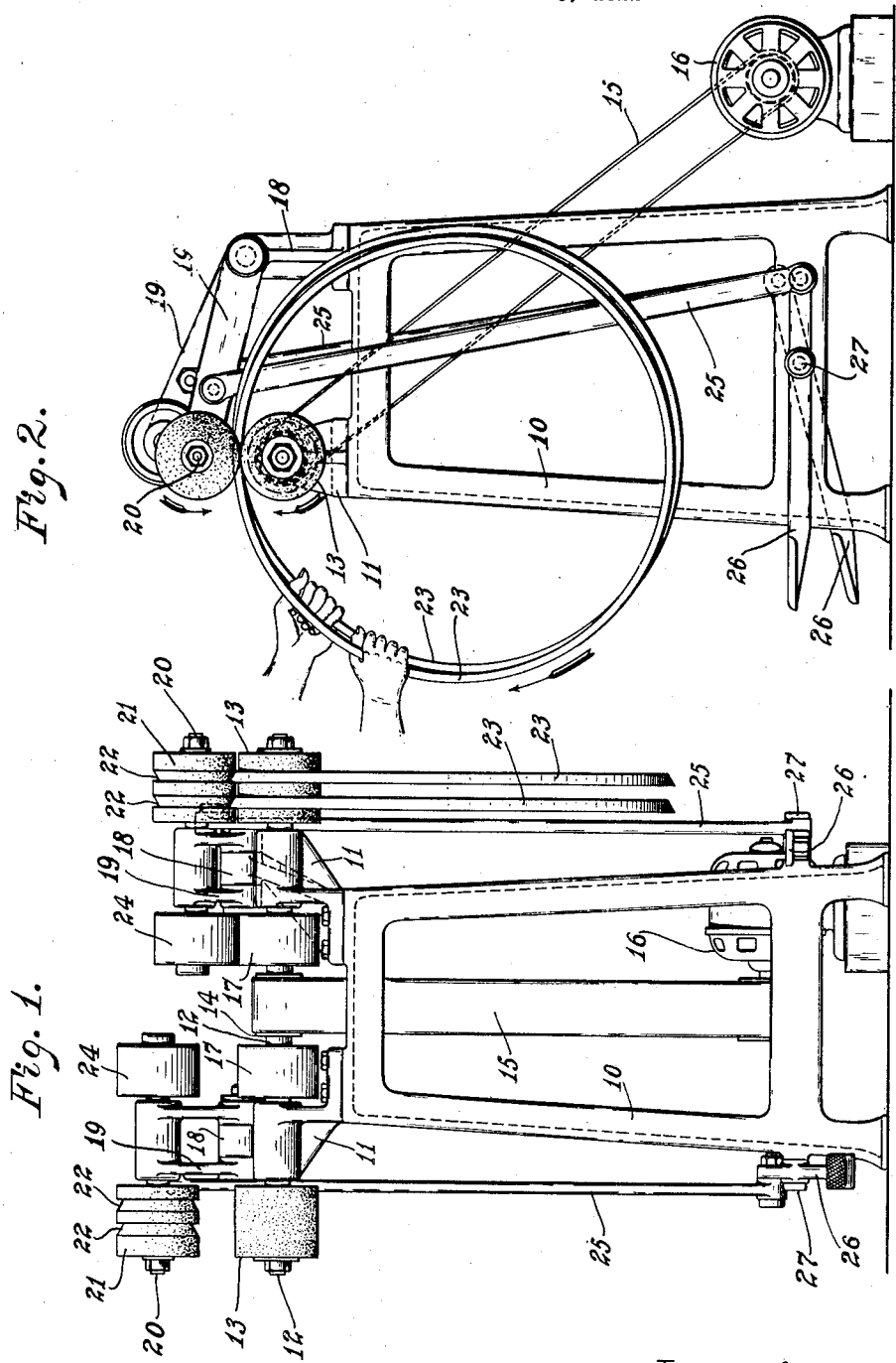

Patented July 6, 1926.

1,591,624

UNITED STATES PATENT OFFICE.

JAMES F. HENNESSY, OF AKRON, OHIO, ASSIGNOR TO THE B. F. GOODRICH COMPANY, OF NEW YORK, N. Y., A CORPORATION OF NEW YORK.

ABRADING MACHINE.

Application filed March 8, 1922. Serial No. 542,009.

This invention relates to abrading machines, especially to such as are adapted progressively to buff bead-forming material for pneumatic tires, and more particularly to machines for buffing endless beads.

In machines heretofore used, so far as I am aware, rotary wire brushes, or similar abrading members, have been applied to respective sides of the work at different stations, but such brushes are expensive and of short life, and as the abrading members have not been effective as guides for the work, special guiding means therefor have been required. The provision of guiding means adapted to hold a flexible strip of material such as a tire-bead accurately in position to be abraded while moving it longitudinaly past the abrader has presented a difficult problem.

My general object is to provide a simple machine adapted for rapid and uniform work of the character referred to. A more specific object is to provide an improved machine adapted simultaneously to buff all sides of the article, and particularly of an endless tire bead. A further object is to provide a device adapted to use solid or rigid abrading members, such as carborundum abrading wheels, without danger to the operator from the breaking of such members.

Of the accompanying drawings:

Fig. 1 is a front elevation of a machine embodying a preferred form of my invention, adapted to buff endless tire beads.

Fig. 2 is a side elevation of the same.

In the drawings, 10 is a frame having bearing brackets 11, 11 at the top thereof, in which bearings is journaled a horizontal shaft 12, the respective ends of which project beyond said bearings. On each of said projecting ends is secured a cylindrical abrading wheel 13, preferably composed of a material such as carborundum. Secured to said shaft between the brackets is a pulley 14 adapted to be driven by a belt 15 from a motor 16, and on each side of said pulley, between the brackets, is a friction drive-roller 17, secured to the shaft.

Upon brackets 18, 18, at the upper, rear part of the frame 10, adjacent the respective bearings 11, 11, are pivoted arms 19, 19, each formed with a horizontal bearing at its free end, in which bearing is loosely journaled a shaft 20 parallel with the shaft 12. On the respective outer ends of said shafts 20 are secured abrading wheels 21, 21, which may be of the same material as the wheels 13, said wheels having cylindrical faces interrupted by grooves 22, 22 conforming to the shape of the work, here represented as a number of endless tire beads 23, 23 of triangular cross-section and having cylindrical inner faces fitting the abrading wheels 13. Each of the wheels 13, together with the adjacent wheel 21, when the latter is swung into abrading position upon its arm 19, defines a number of work receiving spaces having the cross-sectional form of the work.

For driving each of the wheels 21, and also to prevent it from coming into contact with the corresponding wheel 13, a friction roller 24 is secured upon the inner end of each of the shafts 20, in position to be associated with the corresponding friction drive-roller 17, and adapted to run on and be driven by the latter when allowed to bear thereon under the weight of the arm 19 and parts carried thereby.

For independenly raising the respective arms 19, to open apart the abrading wheels 13, 21, and permit the insertion or removal of the work, a link 25 connects each of said arms with the rear end of a treadle lever 26 pivoted on the frame 10 at 27.

In the operation of the device, the treadle 26 is depressed, raising the arm 19 and with it the friction roller 24 and the upper abrading wheel 21. The tire beads 23 are then inserted between the wheels 13 and 21, as shown, and the treadle released to lower the arm 19, so that the grooved wheel 21 closes upon the work and the friction roller 24 bears upon the friction drive roller 17. The latter meanwhile may have been driven by the motor 16, or may now be driven, causing the pair of abrading wheels to be driven in the directions indicated by the arrows in Fig. 2, their adjacent sides moving away from the operator, so as to throw the abraded particles away from him and to draw the work forward between the wheels. This forward movement of the work is retarded by the hands of the operator, as indicated in Fig. 2, to produce relative movement of the abrading wheels upon the work, although he permits the work gradually to be drawn forward, so as to abrade the latter progressively.

The grooved wheel being above and the cylindrical roller below, the endless beads here shown hang from the lower roller and their own weight assists in holding them in proper relation to the abrading wheels, while said wheels themselves serve as guides for the work.

When the abrasion has been carried entirely around the beads, or so far thereon as is desired, the treadle is depressed, lifting the upper abrading wheel, the beads are removed from the machine, and the operation is repeated.

It is convenient and economical of floor space and of time to provide a dual abrading machine, as shown, and respective pairs of abrading wheels adapted to operate simultaneously upon a plurality of beads, but I do not wholly limit my invention to these specific features, nor do I otherwise limit it except as defined in the appended claims or as may be required by the prior art.

The prevention of contact between the abrading wheels, here effected by the friction rollers 17, 24, is highly important when the abrading wheels are composed of frangible material, since danger to the operator, from flying particles, would result if the wheels came violently in contact while either or both of them were rapidly revolving.

The abrading wheels themselves serve as guides for the work, especially when positioned at the same cross-section of the latter, as shown, wherefore the machine may be simply and cheaply constructed, and, with the construction shown, the work may readily be inserted and removed.

I claim:

1. An abrading machine comprising a pair of parallel shafts, a bearing member for one of said shafts adapted to be moved from and toward the other shaft, a pair of rotary abrading members secured upon the respective adjacent shafts, a pair of aligned friction rollers secured respectively upon the movable-bearing-member shaft and the other shaft, said rollers being adapted by contact with each other to prevent contact of said abrading members, and means for driving one of said shafts.

2. An abrading machine comprising a shaft rotatively mounted in a fixed position, an abrading wheel and a friction drive-roller secured on said shaft, a second shaft loosely journaled parallel with the first shaft, a pivoted mounting for said second shaft, an abrading wheel and a friction roller secured on said second shaft, said friction rollers being adapted by contact with each other to cause rotation of the second shaft and limit the movement of said abrading wheels toward each other, means for driving the first shaft, and means for moving said pivoted mounting.

3. In an abrading machine the combination of a horizontal shaft, an overhanging abrading wheel secured on each end of said shaft, means for driving said shaft, a pair of shafts parallel with the first shaft, a movable mounting for each of said pair of shafts, abrading wheels secured one on each of said pair of shafts in alignment with the first said abrading wheels, and means for driving the upper shafts and for limiting the movement of said mountings to prevent contact of the abrading wheels.

4. In an abrading machine the combination of a horizontal shaft, an overhanging abrading wheel secured on each end of said shaft, means for driving said shaft, a pair of journal members each formed with a bearing over and parallel with said shaft, a shaft journaled in each of said bearings, an abrading wheel secured on each of the last said shafts, in alignment respectively with the first mentioned abrading wheels, a friction roller secured on each of the last said shafts, means on the first said shaft for driving said friction rollers, said means and said rollers being adapted to limit the movement of the abrading wheels toward each other, and means for raising and lowering said journal members.

In witness whereof I have hereunto set my hand this 3 day of March 1922.

JAMES F. HENNESSY.